United States Patent

[11] 3,614,637

[72] Inventor Jacob H. Kubanoff
Philadelphia, Pa.
[21] Appl. No. 872,970
[22] Filed Oct. 31, 1969
[45] Patented Oct. 19, 1971
[73] Assignee The United States of America as represented by the Secretary of the Army

[54] DIVERGENT FILTER SYSTEM
13 Claims, 5 Drawing Figs.

[52] U.S. Cl. .... 328/167, 328/26, 328/127, 328/133
[51] Int. Cl. .... H03k 5/12
[50] Field of Search .... 328/138, 140, 149, 159, 167, 133, 127–128, 26, 32; 321/47, 18; 307/233, 295; 330/107, 109

[56] References Cited

UNITED STATES PATENTS

| | | | |
|---|---|---|---|
| 3,021,481 | 2/1962 | Kalmus et al. | 328/133 |
| 3,109,143 | 10/1963 | Gluth | 328/133 |
| 3,223,929 | 12/1965 | Hofstad | 328/32 |
| 3,308,389 | 3/1967 | Toman et al. | 328/167 |
| 3,349,257 | 10/1967 | Thomas et al. | 328/127 |
| 3,371,225 | 2/1968 | Featherston | 328/140 |
| 3,386,039 | 5/1968 | Naive | 328/127 |
| 3,508,075 | 4/1970 | Savage | 328/26 |
| 3,383,600 | 5/1968 | Calfee | 328/127 |

*Primary Examiner*—Donald D. Forrer
*Assistant Examiner*—R. E. Hart
*Attorneys*—Harry M. Saragovitz, Edward J. Kelly, Herbert Berl and S. Dubroff

ABSTRACT: An electrical, easily microminiaturized filter system which exhibits a very steep rolloff, substantially rectangular response by obtaining the divergence or algebraic summation between the positively half-wave rectified response of a band-pass filter and the negatively half-wave rectified response of a band reject filter, both band filters having the same center frequency and bandwidth. Also provided is a synthesizer, including an emitter coupled monostable multivibrator, which is input bias controlled and output modulated to further enhance filter system response rectangularity through the controlled production of low amplitude narrow pulses in the region of rolloff and high amplitude broad pulses at the center of the band.

INVENTOR,
JACOB H. KUBANOFF
BY: Harry M. Saragovitz, Edward J. Kelly, Herbert Berl & S. Dubroff ATTORNEYS.

INVENTOR,
JACOB H. KUBANOFF
BY: Harry M. Saragovitz,
Edward J. Kelly, Herbert Berl &
S. Dubroff ATTORNEYS.

INVENTOR,
JACOB H. KUBANOFF

BY: Harry M. Saragovitz,
Edward J. Kelly, Herbert Berl &
S. Dubroff ATTORNEYS

DIVERGENT FILTER SYSTEM

STATEMENT OF GOVERNMENT INTEREST

The invention described herein may be manufactured, used, and licensed by or for the Government for governmental purposed without the payment to me of any royalty thereon.

BACKGROUND OF THE INVENTION

This invention relates to an electrical, divergent filter system having very steep rolloff characteristics. More particularly, the invention relates to a divergent filter system having no inductive elements which provides a rolloff rate of many times the rolloff rate of state of the art noninductive filters. With the present invention, rolloff rates on the order of hundreds of db/octave are realizable. The filter system is readily microminiaturized and is thus suitable for use in the fields of telemetry, sonar, radar, or other areas where a steep rolloff, microminiaturized filter is desired.

In the past, in order to provide a filter system having the rolloff capability of the present invention, it was necessary to cascade a considerable number of complicated inductive filter networks. Such cascaded networks are generally relatively large and cumbersome due to the presence of inductors, which are necessary to provide the steep rolloff. Unfortunately, inductors cannot be microminiaturized to the extent the resistors, capacitors, and active elements may be. Consequently, with the development of microminiaturization there arose a need for a filter system which provides a very steep rolloff and which at the same time might be microminiaturized by any of the known techniques. The present invention, being inductorless, comprises such a filter system.

SUMMARY OF THE INVENTION

The invention comprises a divergent filter network of active and passive elements (but containing no inductors) and a synthesizer connected to the filter output. The filter responses of an active band pass and band reject filter, both filters having the same bandwidth and center frequency, are combined to provide a divergent or algebraically summed filter response which has the same center frequency as that of the two active filters but a reduced bandwidth. More importantly, however, is the fact that the rolloff of the divergent response is substantially steeper and more rectangular than those exhibited by the active filters. The result is a filter response, almost rectangular in form, centered around the same preselected center frequency and having a predeterminable bandwidth. Moreover, by amplifying the band reject filter output prior to combining it with the band pass filter output, the rectangularity of the overall filter response may be further enhanced.

Since the resultant response is essentially rectangular, it may be utilized to detect a desired signal within a given region or band of frequencies without fear of signal loss or masking at the band fringes.

Desired signal detection may be achieved by providing an input signal, which may contain the desired signal, to the noninverting input of an operational amplifier within an active band pass filter. The inverting input of this operational amplifier is connected to a passive band reject filer and to the noninverting input of a second, but variable gain, operational amplifier. If the heretofore mentioned input signal contains a desired signal (i.e., a signal within the pass band of the active band pass filter) then both active filters provide output voltages or responses, whereupon the band pass filter voltage is positively half-wave rectified and the band reject filter voltage is negatively half-wave rectified. The resultant rectified voltages are then summed and integrated to yield a particular DC value for the particular, received, desired frequency signal at any given instant of time. This DC value of voltage is operated upon by a synthesizer to produce a useful wave shape. This shape may be a square wave of controlled amplitude and pulse width, or a reconstituted sinusoid similar to the original input signal or an integrated DC output signal.

The synthesizer comprises an emitter-coupled, monostable, multivibrator which is triggered by the output signal from the active band pass filter (to maintain signal phase) and which received the divergent filter DC output voltage as its bias. The divergent filter output is also coupled to the output of the multivibrator, the coupling being through an amplifier and a resistor. Since the pulse width of an emitter-coupled, monostable, multivibrator is proportional to the bias supplied thereto, and since the bias signal is the DC output from the divergent filter, the multivibrator's pulse width output provides information which is a function of the divergent filter output. Additionally, the amplitude of the multivibrator's output pulses is made to depend upon the divergent filter DC output since this DC voltage modulates the multivibrator's output through the aforementioned amplifier and resistor. In this way, both pulse width and pulse amplitude are controlled.

DESCRIPTION OF THE PREFERRED EMBODIMENT

Figures 1, 3:
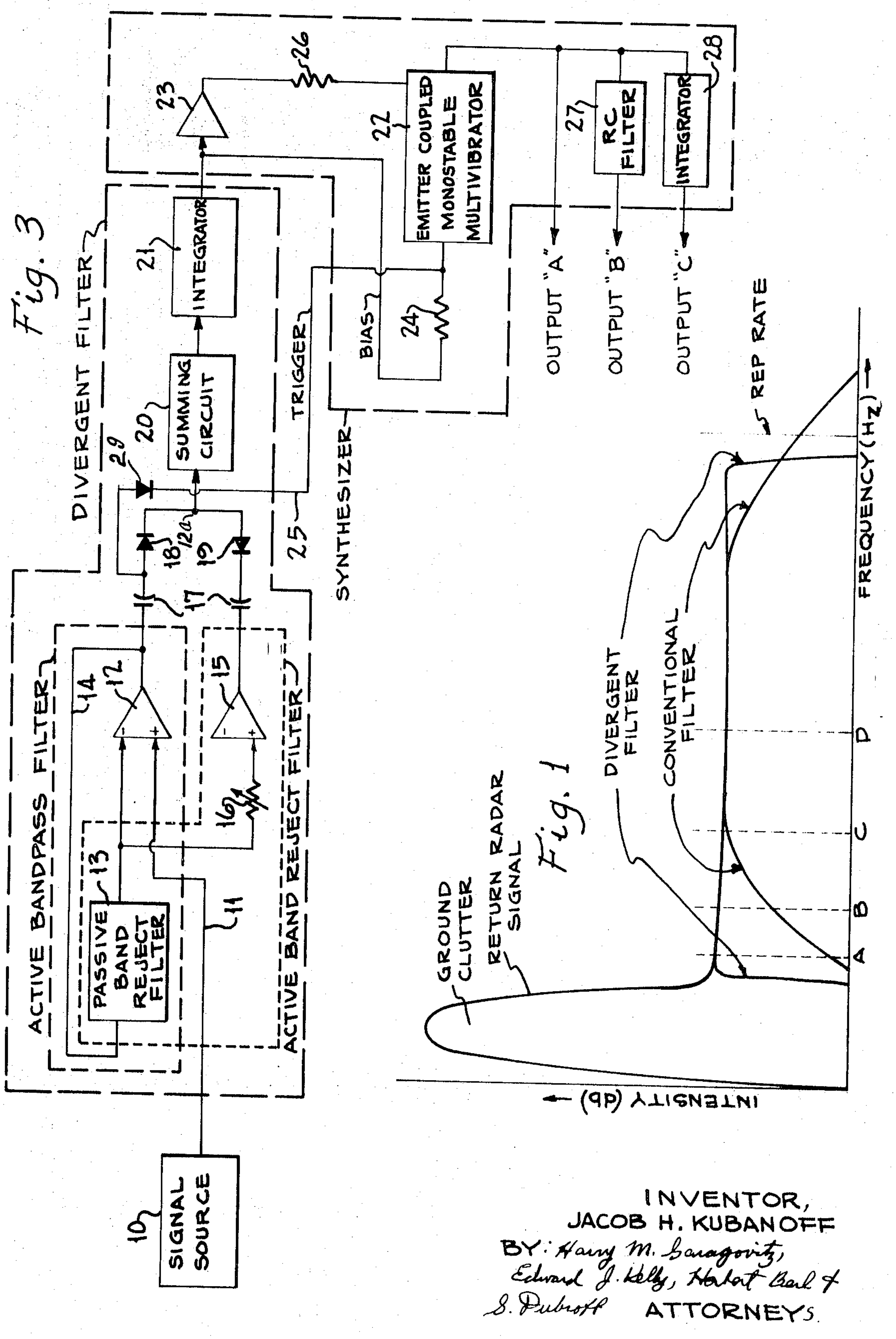
FIG. 1 is an illustrative, graphical representation of a ground return radar signal having superimposed thereon the characteristic filter curves of both a conventional filter and the divergent filter system in accordance with the invention.
FIG. 3 is a schematic block diagram, showing the divergent filter and the synthesizer coupled thereto.

Referring now to FIG. 1, there is shown a representative, return radar signal containing ground clutter in the very low frequency thereof and desired signal information in the higher frequency portion. Superimposed upon this signal are the band pass characteristic curves of both the divergent filer and of a conventional filter. The frequency points A, B, C, and D represent respectively, the frequencies exhibited by a crawling man, a walking man, a running man, and moving vehicles.

As can be seen from FIG. 1, with the use of conventional filters, detecting the crawling man (frequency A) is virtually impossible. Moreover, detecting the walking man (frequency B) is relatively difficult since the return radar signal is substantially attenuated by the filter and the desired signal may readily be masked by the attendant noise and ground clutter. While it is possible to design a conventional filter having lower frequency characteristics, to do so necessitates accepting ground clutter as part of the signal since the filter rolloff s on the order of 24 db/octave and hence is not steep enough to effectively separate the ground clutter from the signal. Moreover, such a filter of conventional design would be large and cumbersome. Conversely, the divergent filter, with its steep rolloff, detects unattenuated the frequency signal response of both the crawling and walking man in addition to the other desired signals.

Figures 2A, 2B:
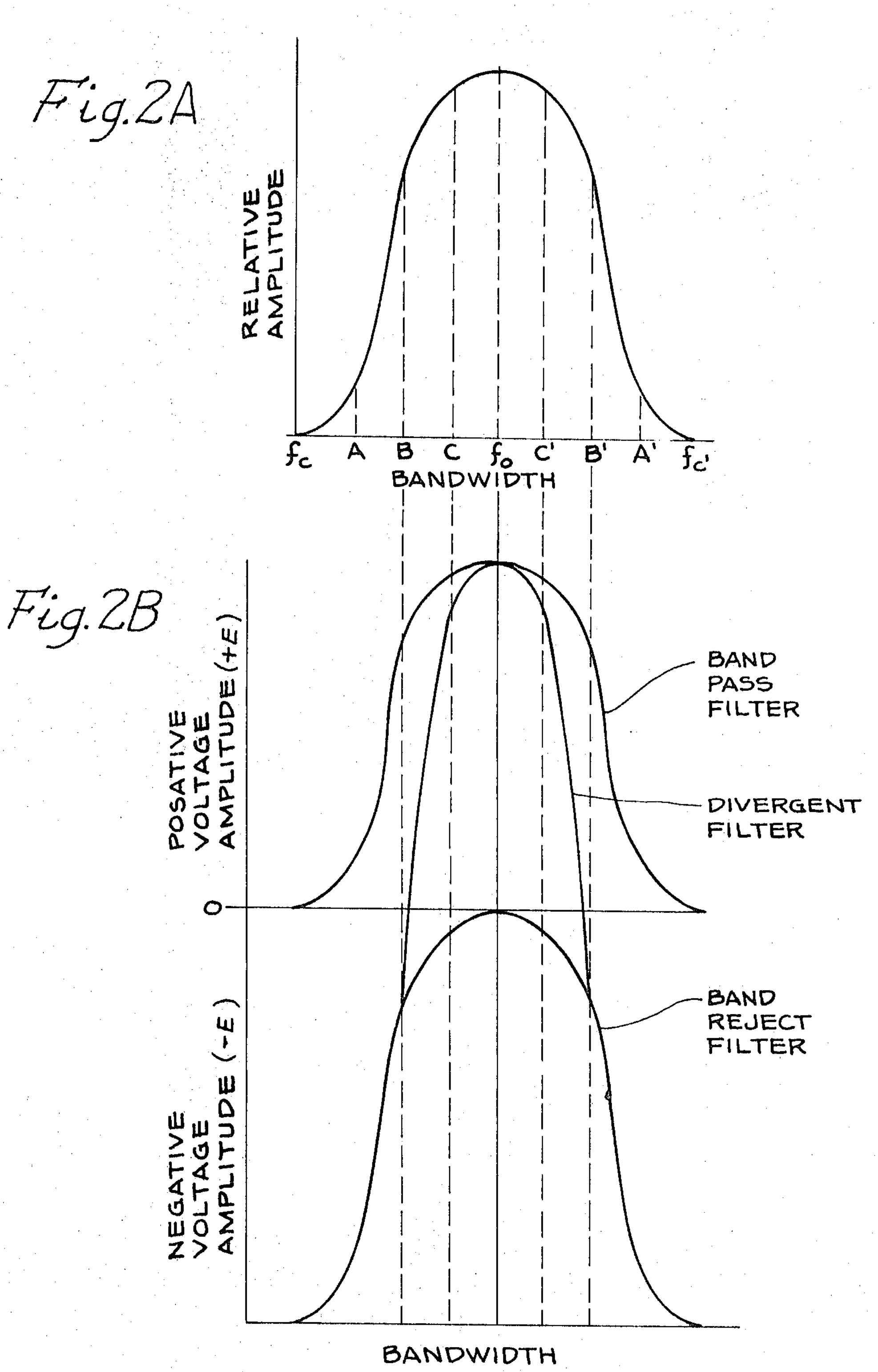
FIGS. 2A and 2B are illustrative, graphical representations of the manner in which the divergence of a band pass and band reject filter is utilized to obtain the pass band characteristics of the divergent filter.

Referring now to FIGS. 2A and 2B, the divergent filtering technique will be explained. FIG. 2A represents the typical band pass spectrum of a hypothetical filter. The present invention modifies the response of FIG. 2A so that the power of the signal will be reduced over the region ABC, A'B'C' and the normal power in the region CC' will be retained. This is achieved by providing two filters, an active band pass filter and an active band reject filter. Each of these filters share or commonly use a passive band reject filter which functions to provide an output signal for a given band when a received signal is not within that band. Such filters are well known in the art and in general comprise resistive and capacitive elements in cascaded or bridge circuit topology. The use of this filter sharing technique insures that both active filters have the same characteristics and eliminates the need for providing two filters having essentially the same characteristics. However, the use of two such filters, one a passive band pass filter and the other a passive band reject filter, is contemplated as will be discussed more fully hereinafter. How the active band pass and reject filters are utilized can best be explained with reference to FIG. 2B.

From the top half of FIG. 2B it is seen that only the positive excursions of the input sinusoid passing through active band pass filter are utilized. These excursions generate a positive voltage of increasing magnitude as the signal reaches the center of the pass band. Conversely, the active band reject filter provides a decreasing signal as the center of the band pass is reached. However, if only the negative excursions of the sinusoid in this filter are utilized then a decreasing negative signal is developed as the center of the rejection band is reached. This signal is shown schematically in the bottom half of FIG. 2B. How these respective excursions are generated will be discussed more fully hereinafter. The resultant divergent filter response to obtained by adding the respective amplitudes at like frequency points of the positive excursions of the band pass filter and the negative excursions of the band reject filter. This resultant divergent filter composite is shown and labeled in FIG. 2B. As can be seen from this figure, the power between the frequencies CC′ has been retained and a filter response having steep rolloff characteristics has been achieved. Note that such a combination does not effect the amplitude at the enter of the band but it does decrease the voltage—amplitude more rapidly as the frequency deviates from the center of the pass band. Moreover, as the active reject band filter gain is increased, the amplitude—E increases and a proportional increase is evident over every point of the band pass curve so that the rolloff of the divergent filter is directly proportional to the ratio of the gain of the band pass filter verses that of the reject filter. In other words, merely by increasing the gain of the band reject filter, the rolloff of the divergent filter can be made more and more steep.

Further rolloff improvement is provided by means of the synthesizer, discussed hereinafter. The synthesizer uses as its bias the DC output signal from the divergent filter above discussed. This bias is used to control output pulse width. The emitter-coupled, monostable, multivibrator, for example, provides a pulse the width of which is proportional to the applied emitter bias. Moreover, since for any given frequency within the pass band of the divergent filter the output thereof will be a positive DC voltage, using this voltage as a bias signal enables the output pulse width of the multivibrator to be controlled. In addition, the divergent filter output is also used to modulate the output voltage of the multivibrator so that the output pulse therefrom changes in amplitude proportionally with a change in bias or divergent filter output voltage. A trigger signal taken from the output of the positive excursion band pass filter insures that the multivibrator will be in phase with the divergent filter. The next result of the application of the synthesizer stage is to effect a further increase in rolloff by the bias controlled production of low amplitude narrow pulses in the region of filter rolloff and high amplitude, broad pulses at the center of the band. These broad, high amplitude pulses may then be passed through an RC filter, for example, to provide a reconstituted sine wave signal.

Referring now to FIG. 3, the divergent filter system will be explained. A signal source 10 (which may comprise a return radar signal as discussed heretofore with respect of FIG. 1) provides a signal via the line 11 to the noninverting input of operation amplifier 12, positioned within the active band pass filter. The amplifier 12 is also connected at its inverting input to the output of a passive band reject filter 13. Amplifier 12 is connected in the negative feedback mode via the line 14 to the input of passive band reject filter 13. The inverting input of amplifier 12 is also connected to the noninverting input of a second operation amplifier 15, the connection being completed through a variable resistor or potentiometer 16 or the like to control the gain of amplifier 15. The outputs from amplifiers 12 and 15 are connected, respectively, through coupling capacitors 17, to positive half-wave rectifier 18 and negative half-wave rectifier 19. These rectifiers, which may comprise solid state diodes, are joined together at their outputs, at point 12*a* , and connected to the input of a summing circuit 20, the output of which is connected to a long time constant integrator 21. The output of integrator 21 is connected to an emitter-coupled, monostable, multivibrator 22 through a buffer amplifier 23, and a resistor 26. Integrator 21 is also connected to the multivibrator 22 through an isolating resistor 24. This latter connection provides a bias circuit for the multivibrator 22. Also connected to multivibrator 22, at the other side of the bias resistor 24 is a forward biased diode 29 which, via the line 25, provides a trigger signal from the active filter to the synthesizer. This maintains signal phase within the system. The multivibrator 22 is also connected to provide, respectively, outputs A, B and C. Output A is merely the multivibrator output and therefore comprises a square wave response of controlled pulse width and amplitude, as will be hereinafter explained. Output B is provided through a conventional RC filter 27 to smooth the square wave and thereby provide a reconstituted sinusoid. Integrator 28 is of the long time constant type and as such provides a DC output at output C.

The multivibrator 22 may in its simplest form comprise an input and output transistor, the base of the input transistor receiving the trigger signal and further receiving the bias signal through the isolating resistor 24. The emitters of both transistors would be connected together and tied to ground through a common emitter impedance. The collector of the input transistor may be tied to a source of voltage while the collector of the output transistor may be connected to the resistor 26 so that the multivibrator output is proportional to the bias signal. The collector of the input transistor may be connected to the base of the output transistor through the parallel combination of a resistor and a capacitor.

For ease of illustration, and since the signal source 10 may comprise a return radar signal, it may be assumed that desired signal information, if any, will be known to appear at least within a 4000 Hz. band. In operation, if a desired signal occurs at the exact center of this band, then amplifier 12 will completely pass it since reject filter 13 will completely reject it. In other words, at the exact center frequency, $f_o$, amplifier 12 will pass the signal and while it will be fed back via line 14, reject filter 13 will completely block it so that no output will issue therefrom. Accordingly, amplifier 15 will receive no input and therefore provide no response. This condition provides the apex of the divergent filter response, FIG. 2B.

If the desired signal is deviated from $f_0$ (either positively or negatively) then band reject filter 13 will provide an output which is a function of the degree of deviation. The greater the deviation from $f_o$, the larger will be the reject filter 13 output. Thus for signals at or near $f_o$, filter 13 will provide no or little output. Whereas, for signals at or near the band fringes, filter 13 will provide maximum or nearly maximum output. Reject filter 13 thus functions to decrease the output of amplifier 12 and to increase the output of amplifier 15 as the desired frequency deviates farther and farther from $f_o$.

Thus, the active band filter provides the entire divergent filter response at the center frequency, $f_o$. At all other frequencies within the pass band, the active band pass filter output is decreased while the active band reject filter output is increased. At the fringes of the band, the active band reject filter provides all of the divergent filter response and the active band pass filter is quiescent.

The output signals from the active band pass filter are coupled through capacitor 17 and only the positive excursions thereof are passed by diode 18. These output signals are also coupled through diode 29 to trigger the multivibrator 22.

The output signals from the active band reject filter are coupled through like-capacitor 17 and only the negative excursions thereof are passed by diode 19. The output responses from diodes 18 and 19 summed by summing circuit 20 are integrated by integrator 21 to provide at the output thereof the divergent filter response shown in FIG. 2B. As noted heretofore, the steepness of the curve of FIG. 2B may be controlled by controlling the gain of amplifier 15 by means of the potentiometer or variable resistor 16 so that the overall gain of the active band reject filter may be made considerably greater than that of the active band pass filter.

It should be apparent that by adding only positive and negative excursions, a subtraction process is taking place. This subtraction process may be effectuated by a phase compensation network lieu of diodes 18 and 19 as long as the signals from amplifiers 12 and 15 are maintained 180° out of phase with each other. Similarly, any device which provides the algebraic summation of the signals from amplifiers 12 and 15 will yield the desired result of providing the divergent response.

Of course, for any given frequency, the output of the divergent filter will comprise a DC voltage at some point on the divergent filter curve. This voltage is achieved, as discussed heretofore, by adding the respective amplitude outputs, at a like frequency point, of the active band pass and active band reject responses.

Upon receiving this DC voltage as a bias, the multivibrator 22 provides an output pulse having a width proportional to the supplied bias. Similarly, since this same DC voltage is connected to modulate the multivibrator 22 output, the pulse amplitude is also a function of the DC voltage. Since the product of the pulse amplitude and the pulse width is the power in the pulse, the resultant output power is indicative of the divergence of the filter and completely controlled thereby. Thus, if the received input signal is at or near the center of the active filter pass band there will be produced a high amplitude, wide pulse at the output of multivibrator 22. Conversely, if the input signal is near the band fringes, multivibrator 22 will provide a low amplitude, narrow pulse. In either case, this output power pulse may be utilized as is, at output A, or may be filtered by a suitable RC filter 27 to provide at output B a reconstituted sine wave. In like manner, the signal may be passed through an integrator 28 to provide at output C a DC output signal.

Figure 4:
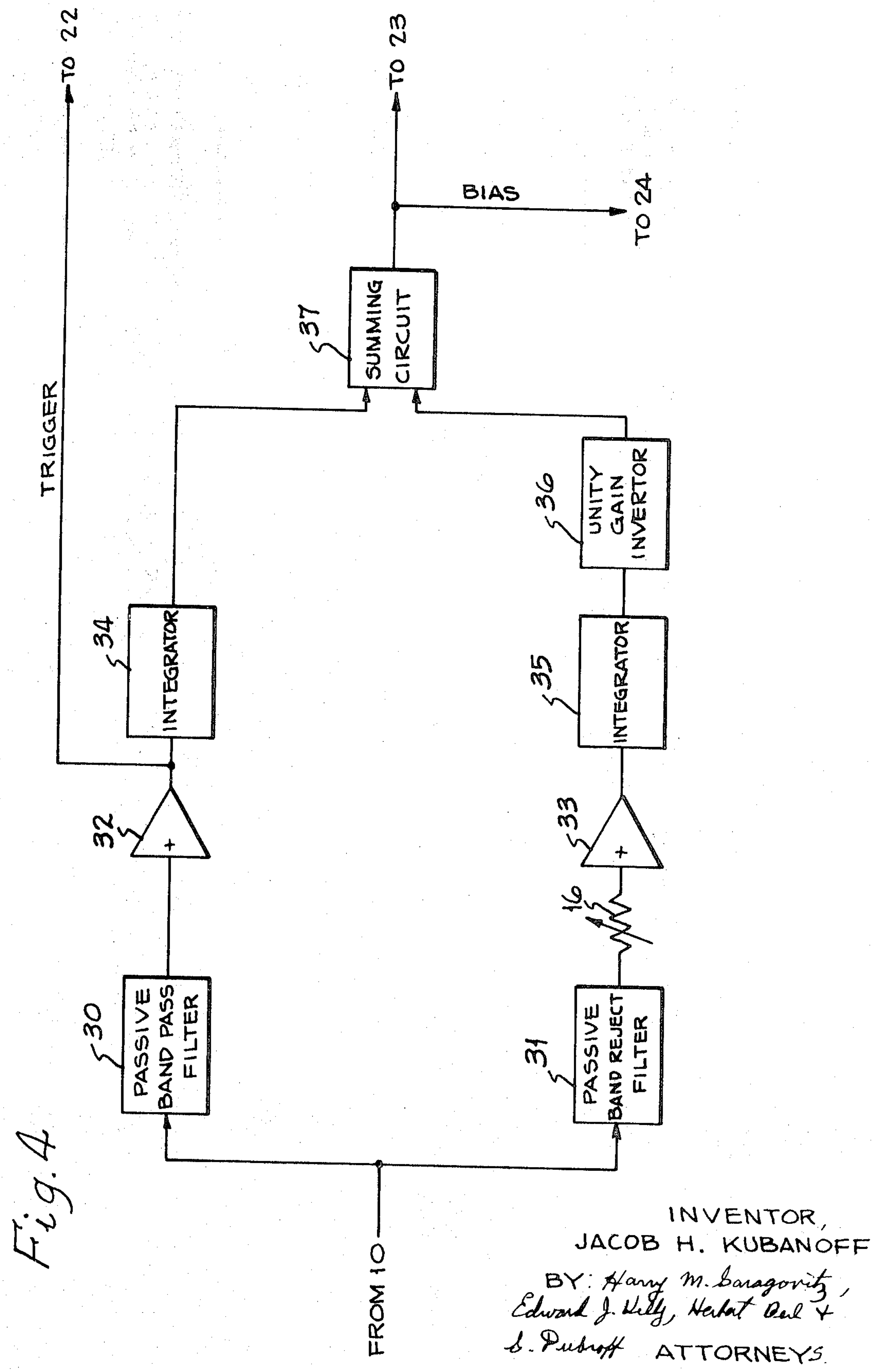
FIG. 4 is a modification of the divergent filter portion of the invention shown in FIG. 3.

Referring now to FIG. 4, there is shown a modification of the divergent filter portion of the system of FIG. 3. In lieu of the active band pass and band reject filter combinations, there is here provided a passive band pass filter 30 and a passive band reject filter 31. Each of these filters must be matched to have essentially the same bandwidth and center frequency. These filters simultaneously receive the signal from source 10. At the center frequency $f_0$ only filter 30 provides an output. At the band fringes, only filter 31 provides an output. At all other frequencies within the band both filters provide an output, filter 30 providing the larger signal the nearer the received signal is to $f_0$. Each of the signals produced by filters 30 and 31 is amplified by noninverting amplifiers 32 and 33, respectively, the gain of amplifier 33 being controlled by potentiometer 16. The output from amplifier 32 may be utilized to trigger multivibrator 22 either directly or through diode 29. The amplifier 32 output is also utilized to feed a long time constant integrator 34 which, due to the lengthy time constant, functions to essentially rectify the signal received thereby. Similarly, integrator 35 substantially rectifies the signal received from amplifier 33. The integrator 35 output is fed to a unity gain inverter 36 which inverts the signal. This inverted signal is fed to a summing circuit 37 (which also receives the output from integrator 34). Summing circuit 37 adds the signals received thereby to provide the DC output response of the divergent filter and feeds it through resistor 24 as a bias current to multivibrator 22 and as an output control for multivibrator 22 through buffer amplifier 23 and resistor 26. This combination of elements is more direct than the design of Fig. 3 but necessitates the matching of filters 30 and 31.

It has been shown that the present invention operates by obtaining the divergence between a band pass and band reject filter to thereby provide a very steep roll off filter response. This response may be made even more steep by controlling the gain of the band reject filter, be that filter either an active or passive one. In addition, it has been shown that the use of a synthesizer wherein both pulse amplitude and pulse width are controlled further enhances rolloff and response rectangularity due to the controlled production of low amplitude, narrow pulses in the region of rolloff and high amplitude, broad pulses at the center of the band.

The above description of the present invention was presented in combination with a ground return, radar signal for illustrative purposes only. Of course, to be understood that there are many other uses for the present divergent filter technique. For example, the invention may be utilized with a plurality of adjacent filters in a comb filter design with minimal, if any, overlap in the regions between adjacent filters within the comb.

I wish it to be understood that I do not desire to be limited to the exact details of construction shown and described for obvious modifications will occur to a person skilled in the art.

I claim:

1. A steep rolloff divergent filter system, comprising:
   - first band-pass filter means and a second band reject filter means both having identical center frequencies and bandwidth, for respectively providing first and second output signals upon the receipt of a signal within said bandwidth;
   - rectifying means connected to said first and said second filter means for respectively providing only the positive excursions of said first output signal and only the negative excursions of said second output signal; and
   - circuit means connected to said rectifying means for providing a DC summed output signal upon the receipt of said positive and negative excursions.

2. A steep rolloff filter system according to claim 1, further including:
   - synthesizer means connected to said circuit means for converting said DC output signal into a signal of predetermined wave shape.

3. A steep rolloff filter system according to claim 2, wherein said first filter means comprises:
   - a first operational amplifier having an inverting and a noninverting input; and
   - a band reject filter connected to said inverting input and said first amplifier being connected in the negative feedback mode with said reject filter.

4. A steep rolloff filter system according to claim 3, wherein said second filter means comprises:
   - a second operational amplifier of controllable gain having a noninverting input thereof connected to the inverting input of said first amplifier.

5. A steep rolloff filter system according to claim 4, wherein said circuit means comprises:
   - a summing circuit for receiving said positive and negative excursions; and
   - a long time constant integrator connected to receive the summed output from said summing circuit for providing said DC output signal.

6. A steep rolloff filter system according to claim 5, wherein said synthesizer means connected to said circuit means comprises:
   - a monostable multivibrator connected to receive as a bias current said DC output signal;
   - an amplifier connected to receive said DC output signal for amplifying said signal for supply to said multivibrator to modulate the output signal therefrom; and
   - further including means connected to the output of said first filter means for providing a trigger signal to said multivibrator.

7. A steep rolloff filter system accordingly to claim 6, wherein said means connected to said circuit means further includes:
   - a filter connected to the output of said multivibrator for providing a reconstituted sinusoid upon the receipt of the output signal from said multivibrator.

8. A steep rolloff filter system according to claim 6, wherein said means connected to said circuit means further includes:
   - a long time constant integrator connected to the output of said multivibrator for providing an integrated DC output signal upon the receipt of the output signal from said multivibrator.

9. A steep rolloff filter system according to claim 2, wherein said first and second filter means comprise:

a passive band pass filter;

a first amplifier connected to said band pass filter;

a passive band reject filter; and a second amplifier, said second amplifier having a variable gain and connected to the output of said reject filter.

10. A steep rolloff filter system according to claim 9, wherein said circuit means comprises:

a first long time constant integrator connected to said first amplifier for integrating the signal amplified thereby;

a second long time constant integrator connected to said second amplifier for integrating the signal amplified thereby;

a unity gain inverter connected to said second integrator for inverting the output signal therefrom; and a summing circuit connected both to said first integrator and said invertor for summing the output signals produced thereby to provide said DC output signal.

11. A steep rolloff filter system according to claim 10, wherein said means connected to said circuit means comprises:

a monostable multivibrator connected to receive as a bias current said DC output signal;

an amplifier connected to receive said DC output signal for amplifying said signal for supply to said multivibrator to modulate the output signal therefrom; and further including means connected to the output of said first filter means for providing a trigger signal to said multivibrator.

12. A method for obtaining a steep rolloff filter response, comprising the steps of:

simultaneously band-pass and band reject filtering a received signal over the same bandwidths and center frequencies to yield filter responses;

positively rectifying a selected one of said filter responses;

negatively rectifying the other of said filter responses; and summing the two rectified responses to provide said steep rolloff response.

13. The method according to claim 12 further including the step of:

amplifying the band reject filter response prior to rectification thereof.